Figure 1:
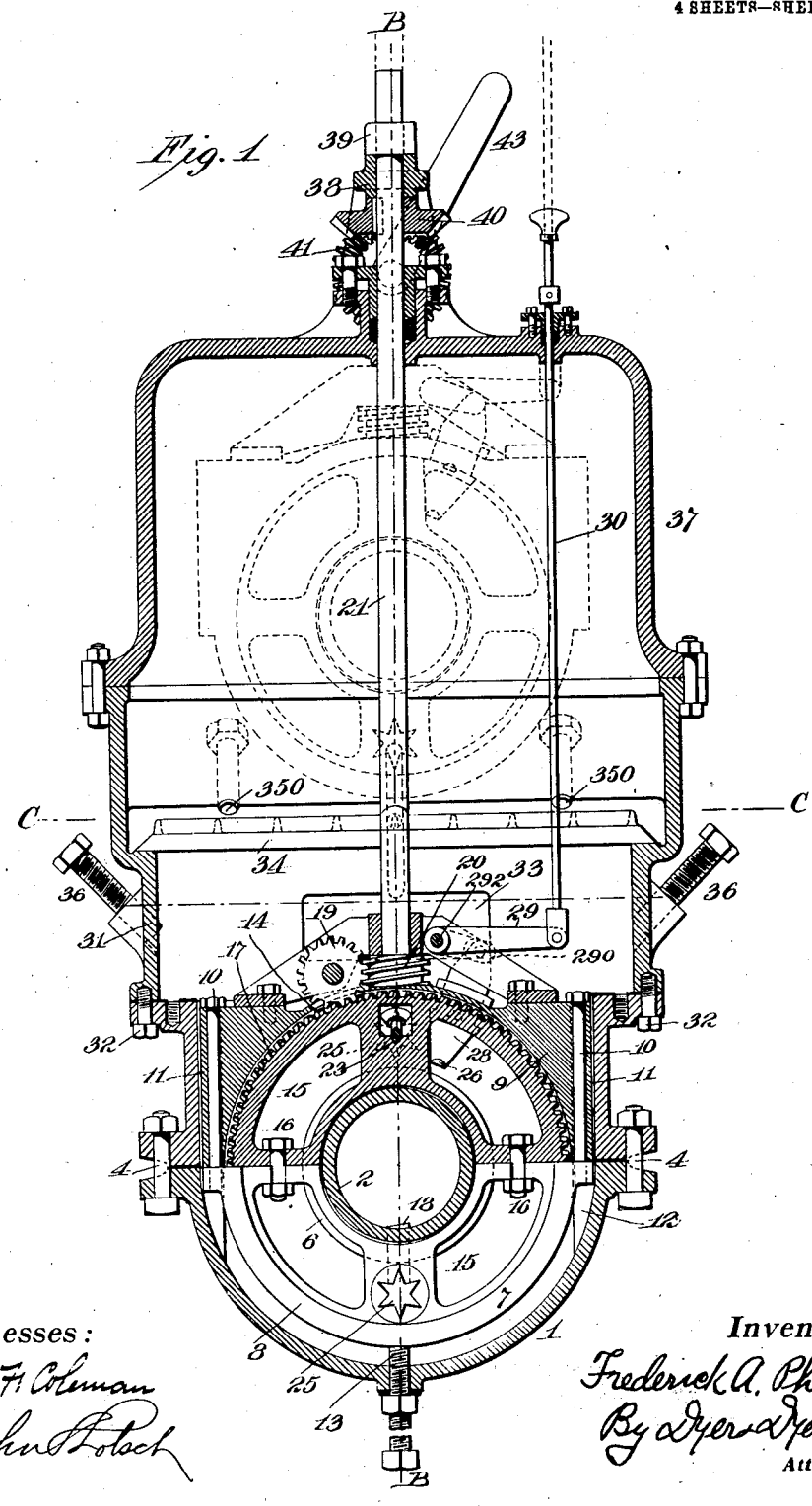

F. A. PHELPS.
VALVE INSERTING MACHINE.
APPLICATION FILED JAN. 5, 1907.

940,356.

Patented Nov. 16, 1909.
4 SHEETS—SHEET 1.

Witnesses:
Jas. F. Coleman
John Polsch

Inventor
Frederick A. Phelps
By Dyer & Dyer
Attorneys.

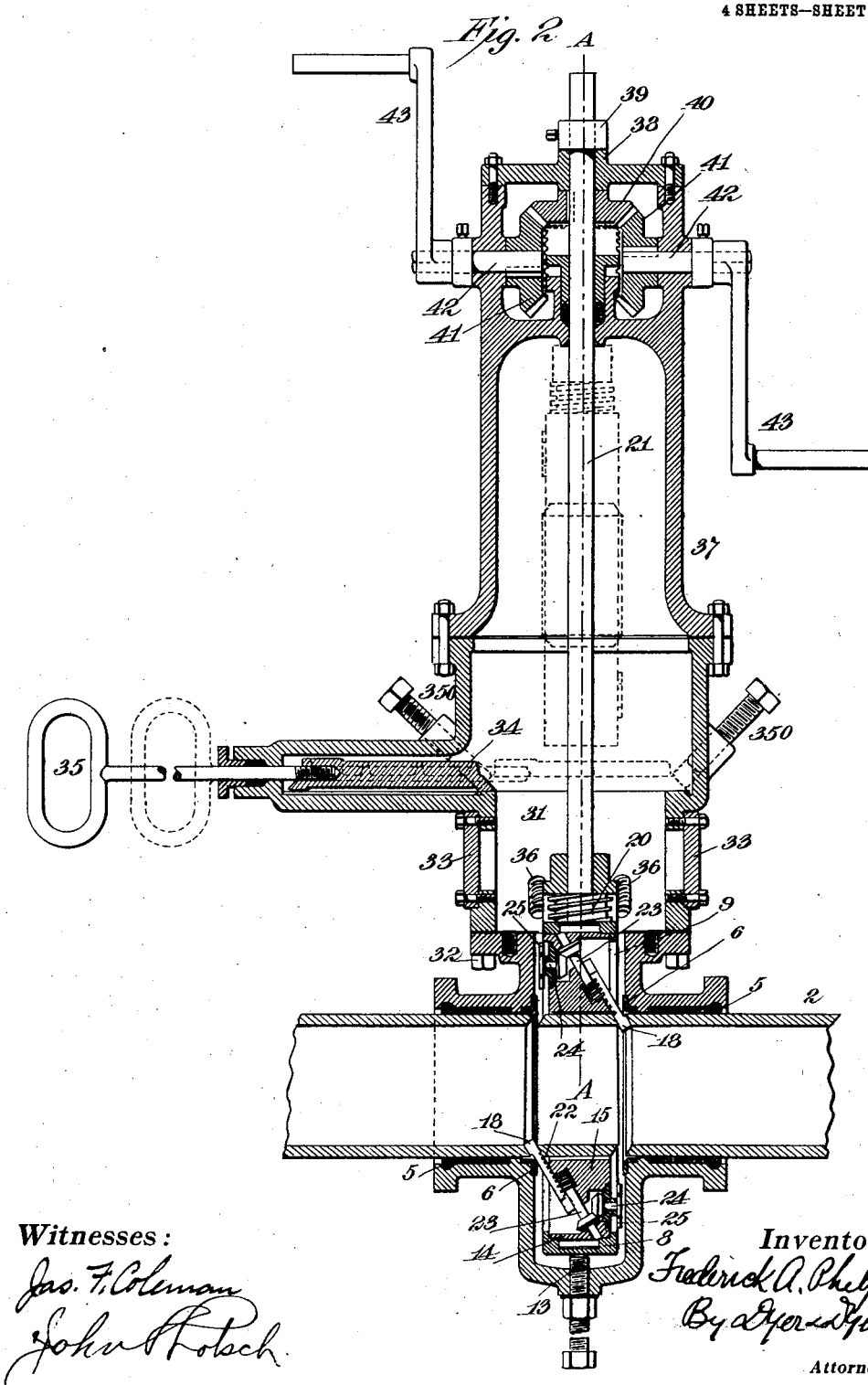

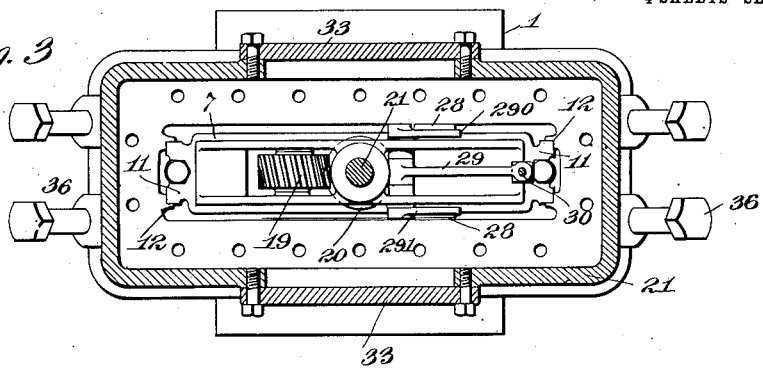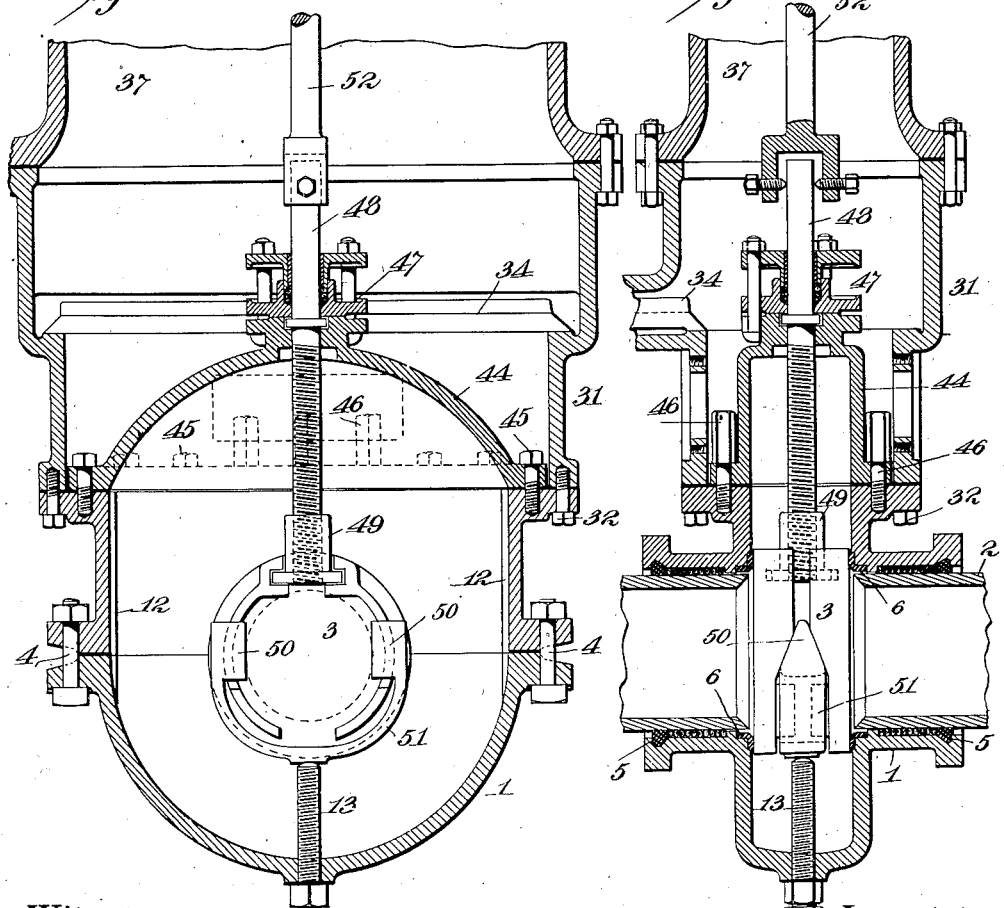

F. A. PHELPS.
VALVE INSERTING MACHINE.
APPLICATION FILED JAN. 5, 1907.
940,356.
Patented Nov. 16, 1909.
4 SHEETS—SHEET 4.
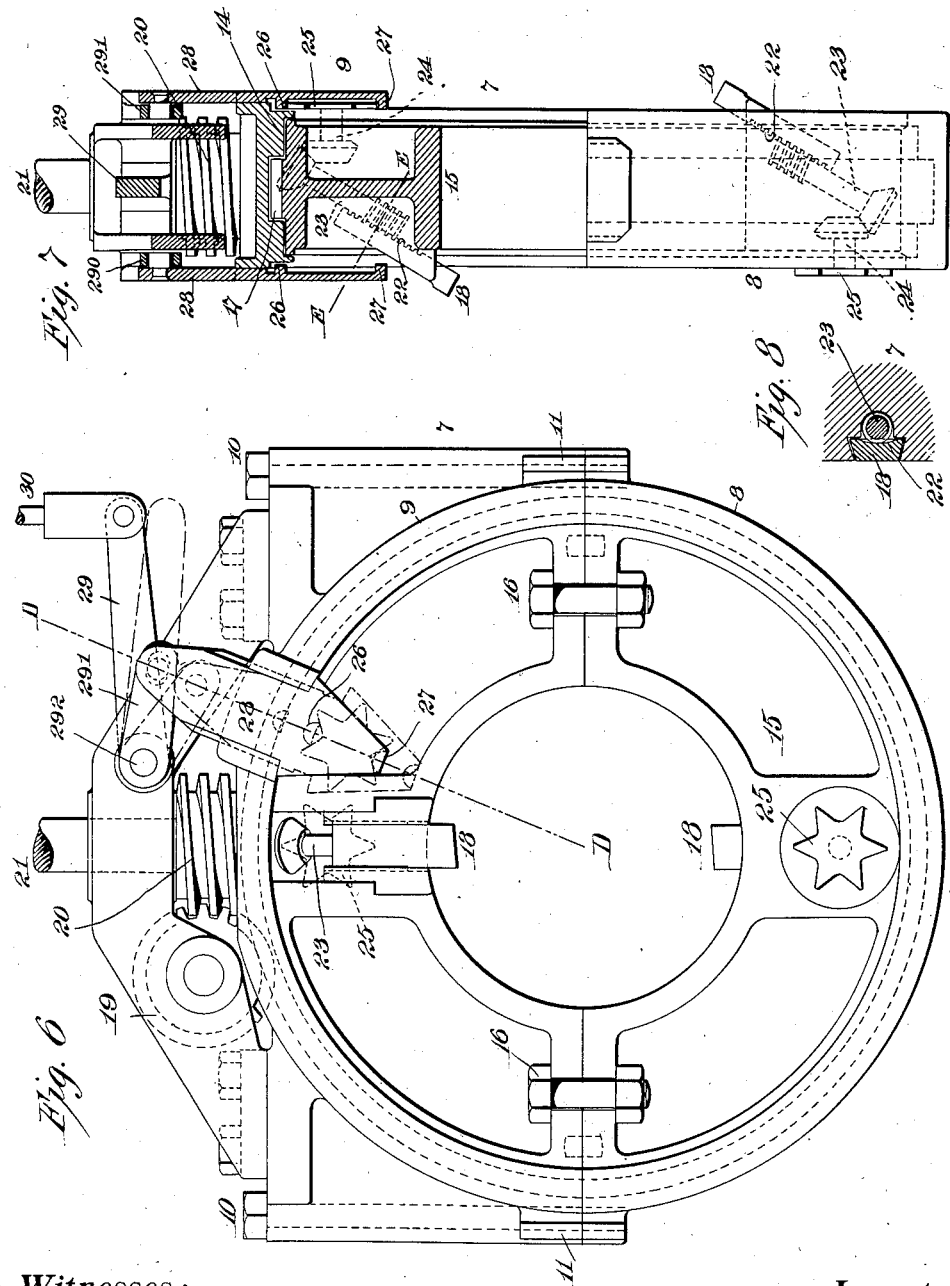
Witnesses:
Jas. F. Coleman
John S. Lobeck
Inventor
Frederick A. Phelps
By Dyer & Dyer
Attorneys.

UNITED STATES PATENT OFFICE.

FREDERICK A. PHELPS, OF NEWARK, NEW JERSEY.

VALVE-INSERTING MACHINE.

940,356.

Specification of Letters Patent.　Patented Nov. 16, 1909.

Application filed January 5, 1907.　Serial No. 350,888.

*To all whom it may concern:*

Be it known that I, FREDERICK A. PHELPS, a citizen of the United States, residing in Newark, in the county of Essex, State of New Jersey, have invented Improvements in Valve-Inserting Machines, of which the following is a specification.

The object I have in view is the production of a machine for inserting valves or gates in pipes containing liquids or fluids, without the necessity of temporarily closing such pipes while the valve or gate is being inserted.

A further object is to produce a device which can be tightly calked upon the pipe before the pipe is cut.

Additional advantages lie in making a device which will utilize a valve or gate with parallel faces which will effectually close the pipe or main.

Other advantages sought to be obtained will more fully appear from the following specification and accompanying drawings, in which—

Figure 1 is a vertical section on the line A—A of Fig. 2, showing the cutting machine applied to a pipe or main, the dotted lines indicating the position that the cutter-head and cutter-head frame assume after the pipe has been cut, the lower part of the cutter-head frame being shown in elevation. Fig. 2 is a section transverse to that of Fig. 1, on the line B—B of Fig. 1, showing the pipe or main with the section cut out. Fig. 3 is a horizontal section taken on the line C—C of Fig. 1. Fig. 4 is a section similar to that shown in Fig. 1, but with the cutting tools removed and the gate or valve substituted. Fig. 5 is a view showing the parts illustrated in Fig. 4, but at right angles to the same, as in Fig. 2. Fig. 6 is an enlarged side elevation of the cutter-head and cutter-head frame. Fig. 7 is a view, partly in section, taken on the line D—D of Fig. 6, and Fig. 8 is a detail view taken on the line E—E of Fig. 7.

In all of the several views, like parts are designated by the same reference characters.

The machine comprises a valve casing 1 to which is adapted to be attached the different mechanisms for cutting the pipe or main 2, and for manipulating the valve or gate 3 (see Figs. 4 and 5). The valve casing 1 is made in two parts, secured together by bolts 4. The joints between the two parts are calked with lead in the usual manner and the joint between the valve casing and the pipe or main is calked at 5, on each end, the calking being the usual lead calking with the usual tamping of hemp or other suitable material inside the lead. The valve casing carries the annular valve seats 6 against which the gate engages to make a tight joint (see Fig. 5).

The cutter-head frame is shown generally at 7 (Fig. 1) as made of two halves 8 and 9. These two halves are connected together by bolts 10. The half 9 is provided with flanges 11, which slide within ways 12 in the valve casing 1 (see Fig. 3). The cutter head frame is supported in position by a bolt 13 which extends through the bottom of the valve casing. The cutter-head frame is provided with an annular track or ways 14 in which turns the cutter-head shown generally by the character 15. This cutter-head is made in two parts connected together by the bolts 16. It has a central opening of such a size as to permit the pipe or main to pass through it. The periphery of the cutter-head is provided with teeth 17 so that the outside constitutes a gear-wheel. The cutter-head carries the tools 18 which are disposed one on each side of the cutter-head so that a cylindrical section may be cut from the pipe or main. The tools are rotated around and in engagement with the pipe or main, the said tools being gradually and continuously fed against the pipe or main so as to cut the same in two and sever a section, of such a size that the gate or valve can work between the cut-off ends of the pipe. The cutter-head is rotated by means of a pinion 19 which engages with the teeth 17. This pinion is turned by means of a worm 20 carried by the shaft 21.

The tools are beveled in cross-section, as shown in Fig. 8 and slide within ways in the cutter-head 15. It will be noted that the ways are inclined so that the tools will be inclined and engage in an inclined direction with the pipe or main which is to be cut. This is very important as it makes it possible to cut the pipe or main and produce an opening wider than the space between the valve seats 6, 6. By making the cutting tools of sufficient thickness, it is also possible to make the piece which is cut from the pipe or main sufficiently narrow so that it will be of less width than the space between the valve seats 6, 6, thus permitting the cut-out section to be removed.

The cutting tools are moved toward and away from the work by intermittently rotated mechanism. This mechanism comprises a rack 22 shown as formed integrally with the cutting tool which is engaged by a worm carried on the shaft 23. Bevel gears connect the shaft 23 with the shaft 24 which carries a star-wheel 25. This star-wheel being carried by the rotating cutter-head, is adapted to engage with a fixed stop and be rotated a partial revolution during every revolution of the cutter-head. The fixed stop is adapted to engage either with the top or bottom of the star-wheel, in order to rotate it in different directions, and advance the tool toward the work or withdraw it from the work without the necessity of reversing the direction of movement of the cutter-head. This is a very important point because if the tools were retracted from engagement with the pipe by rotating the cutter-head in the opposite direction, after they have cut through the pipe, they would jar against the rough surfaces by reason of the engagement of the heel of the tool with the work, resulting in displaced or broken tools.

Two fixed stops 26 and 27 are provided in each tool, both being mounted upon a slide 28 which is carried in ways on the cutter-head frame 7. Levers 290 and 291 carried on a shaft 292 are used to actuate the slides 28 and a rod 30 passing through a stuffing box in the top of the hood 37 serves to operate the lever 29. It will be understood, by reference to the drawings, that the cutters 18, worm shafts 23, star-wheels 25 and stops 26 and 27 are duplicated, one set being carried on each side of the cutter-head and cutter-head frame for the purpose of cutting a cylindrical section from the pipe or main. It will be further understood that the worms on the shafts 23 will be one right and one left so as to properly feed the tools.

The parts thus described are adapted to be placed around the pipe or main 2. Upon the valve casing 1 is bolted a casing 31 by means of bolts 32. This frame is provided with man-holes covered by plates 33 secured in position by bolts, as shown. The frame 31 is provided with a slide valve 34 operated by the handle 35 extending outside of the frame and passing through a stuffing box, as shown in Fig. 2. Inclined bolts 350 with their heads extending outside of the frame 31 engage against the valve 34 and hold it against its seat to prevent leakage at that point. Other inclined bolts 36 are provided in the ends of the frame 31, the inner ends of the bolts being adapted to hold the top of the valve casing in place, as will be described later.

A hood 37 is bolted to the frame 31. This hood has a central hollow part sufficiently large to contain the cutter-head and cutter-head frame when the latter is elevated into it. The shaft 21 passes through a stuffing box in the head of the hood 37. Outside of the stuffing box is a bearing 38 for the shaft 21. This bearing is secured by bolts, as shown in Fig. 2 so that it can be removed. Above the bearing is a collar 39 secured to the shaft 21 by a set-screw, and under the bearing is a bevel gear 40 connected to the shaft by a key so as to rotate the latter. This bevel gear 40 is engaged by two bevel gears 41, 41 connected to short shafts 42 carrying cranks 43 thereon. By rotating the cranks 43, the shaft 21 is also rotated, as is obvious. The valve bonnet 44 is secured to the valve casing by bolts 45 and a few long-headed bolts 46, these latter being on the sides which are adjacent to the man-holes which are covered by the plates 33. The bonnet 44 is provided with a stuffing box 47 through which a shaft 48 passes. This shaft is adapted to elevate or depress the gate 3 in the usual manner. It is shown as screw-threaded at its lower end and engaging with a nut 49. On each side of this nut are the two halves of the gate. Between these two halves are the wedges 50, the said wedges being connected together by a yoke 51 which is adapted to engage with the bolt 13 as the valve is lowered to force the two halves of the gate apart and into engagement with the valve seats. A shaft 52 is temporarily secured to the shaft 48 as shown in Fig. 5.

The operation is as follows:—The cutter-head is first adjusted around the pipe and the two halves bolted together, the cutters being moved outward to their extreme position, so as to be clear of the pipe. The cutter-head frame is then adjusted around the cutter-head and the two parts bolted together by bolts 10. The valve casing is then arranged with its two parts one on each side of the pipe and the joints between the two parts and the joints between the valve casing and the pipe or main are calked. The bolt 13 is then adjusted so as to engage with the cutter-head frame. The casing 31 is next bolted to the valve casing and the hood 37 bolted to the casing 31, the shaft 21 being connected to its gears so as to be rotated. By rotating the cranks 43 the shaft 21 will be rotated, and through the agency of the worm 20, pinion 19, and gear 17, the cutters will be rotated. At each revolution, a tooth on one of each of the star-wheels 25 will engage with one of the stops 27, thus alternately and intermittently advancing the tools against the work. As soon as the pipe is cut through, which will be indicated by decrease of resistance upon the handles, the rod 30 is elevated moving the slide 28 to bring the stops 26, 26 into the path of the star-wheels. The handles 43 are now rotated the same number of times and in the same direction as before. This will withdraw the cutting tools from the work and place them entirely within the cutter-head. The bearing 38 is then removed, and a tackle being attached to the shaft 21, the shaft will be elevated, raising the cutter-head and cutter-head frame into the hood 37. The valve 34 is then closed and locked by means of the bolts 350. The hood 37 is then removed and the shaft 52 substituted for the shaft 21. Upon this shaft is temporarily secured the shaft 48, and with it the bonnet 44 and gate 3. The frame 37 is then replaced, the valve 34 opened and the valve or gate 3 lowered into place with the bonnet 44 resting upon the valve casing 1. The bonnet is held in place temporarily by the inclined bolts 36, so that a tight joint is produced. The man-hole covers 33 are now removed and the long-headed bolts 46 set up on the sides of the bonnet flange. The casing 31 is now removed and bolts put in all around the sides of the bonnet 44 permanently securing it to the valve casing 1. The shaft 52 will now be removed and the ordinary operating hand-wheel placed upon the shaft 48. The bolt 13 will then be screwed in to its full extent so as to form a stop or abutment for engaging the wedges of the valve gate.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described the nature of my invention and in what manner the same is to be performed, what I claim and desire to secure by Letters Patent is:—

1. A machine for inserting a valve in a pipe or main, having a rotary tool holder, an inclined tool thereon, a worm for moving the tool toward or away from the work, a star-wheel for rotating the worm and a frame carrying two stops, and means for moving the frame to cause either of the two stops to engage with the star-wheel to rotate it in one direction or the other and advance or withdraw the tool from the work.

2. A machine for inserting a valve in a pipe or main having a casing with immovable valve seats thereon, a tool holder between the seats and inclined tools carried by the tool holder, and adapted to cut a section from the pipe or main, whereby the gap so formed will be wider than the distance between the valve seats.

3. A machine for inserting a valve in a pipe or main, having a casing with immovable valve seats thereon, a tool-holder between the seats, inclined cutting tools carried by the tool-holder, means for rotating the tool-holder, and means for feeding the cutting tools, for cutting a section from the pipe of less width than the space between the valve seats, and for cutting a gap in the pipe wider than the distance between the valve seats.

This specification signed and witnessed this fourth day of January, 1907.

FREDERICK A. PHELPS.

Witnesses:
LEONARD H. DYER,
JNO. ROBT. TAYLOR.